(12) United States Patent
Tamagawa et al.

(10) Patent No.: US 6,613,107 B2
(45) Date of Patent: Sep. 2, 2003

(54) METHOD OF PRODUCING NICKEL ELECTRODE FOR ALKALINE STORAGE BATTERIES

(75) Inventors: Takuya Tamagawa, Mihara-gun (JP); Yoichiro Shibata, Tsuna-gun (JP); Chihiro Fujisawa, Sumoto (JP); Katsuya Ito, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 158 days.

(21) Appl. No.: 09/968,000

(22) Filed: Oct. 2, 2001

(65) Prior Publication Data

US 2002/0045099 A1 Apr. 18, 2002

(30) Foreign Application Priority Data

Oct. 3, 2000 (JP) .................................... P. 2000-303494

(51) Int. Cl.[7] .......................... H01M 6/00; B05D 5/12; C01G 53/04
(52) U.S. Cl. ................... 29/623.5; 29/623.1; 429/223; 427/126.3; 423/594.3; 205/170
(58) Field of Search .................. 429/223; 29/623.5, 29/623.1, 2; 427/126.3, 126.4, 126.1; 423/594.3, 594.4; 205/170

(56) References Cited

U.S. PATENT DOCUMENTS

| 5,549,992 A | * | 8/1996 | Iwane et al. ................ 429/223 |
| 6,033,805 A | * | 3/2000 | Dansui et al. ............... 429/223 |
| 6,099,991 A | * | 8/2000 | Inagaki et al. .............. 429/235 |
| 6,193,871 B1 | * | 2/2001 | Coates et al. ................ 205/170 |

FOREIGN PATENT DOCUMENTS

| JP | 10-125318 | 5/1998 |
| JP | 10-149821 | 6/1998 |
| JP | 10-255790 | 9/1998 |
| JP | 11-73957 | 3/1999 |

* cited by examiner

*Primary Examiner*—Patrick Ryan
*Assistant Examiner*—Raymond Alejandro
(74) *Attorney, Agent, or Firm*—Nixon & Vanderhye P.C.

(57) ABSTRACT

A method of producing a nickel electrode for an alkaline storage battery, comprising: an active-material loading step comprising preparing an active-material loaded plate electrode by loading an active-material containing nickel hydroxide as its principal component into the pores of said porous electrically conductive substrate; an immersion step comprising immersing said active-material loaded plate electrode into an impregnation solution comprising an acid salt solution containing at least one element selected from the group consisting of Ca, Sr, Sc, Y, Al, Mn, and lanthanides; and an alkali treatment step comprising forming a hydroxide layer on the surface of the electrode plate by converting the acid salt into a hydroxide by immersing said plate electrode into an alkaline solution; provided that the temperature of the impregnation solution is controlled in a range of from 40 to 90° C., and that the pH value of impregnating solution is controlled to a range of from 4 to 6. Thus, it is provided a nickel electrode free from a drop in battery capacity and yet having excellent high temperature characteristics by controlling the amount of elution of the loaded active material even when immersed in an acid salt solution.

4 Claims, 2 Drawing Sheets

METHOD OF PRODUCING NICKEL ELECTRODE FOR ALKALINE STORAGE BATTERIES

BACKGROUND OF THE INVENTION

The present invention relates to a method of producing a nickel electrode for an alkaline storage battery comprising loading a positive-electrode active material containing nickel hydroxide as its principal component into the pores of a porous electrically conductive substrate, and more specifically, a method comprising impregnating a porous electrically conductive substrate (a porous sintered nickel substrate) with an acidic nickel salt, and then performing an alkali treatment.

In order to comply with the recent demand for a rechargeable battery having a higher energy density, improvements are being made on alkaline storage batteries such as nickel-cadmium secondary batteries and nickel-hydrogen secondary batteries. The nickel electrodes that are employed in the alkaline storage batteries of the type above are produced by impregnating a porous electrically conductive substrate (a porous sintered nickel substrate) with an acidic nickel salt, and by then performing alkali treatment and the like. In this manner, a porous electrically conductive substrate can be obtained with a positive-electrode active material containing nickel hydroxide as its principal component being loaded into the pores thereof.

However, in a prior art nickel electrode comprising an active material obtained by converting nickel nitrate to nickel hydroxide, which is prepared by immersing a porous electrically conductive substrate impregnated with a nickel nitrate into an alkali, the potential of oxygen evolution at the nickel electrode falls close to the charging reaction potential of nickel hydroxide. Particularly, since the potential of oxygen evolution (i.e., the oxygen overvoltage) decreases at higher temperatures, the oxidation reaction of the nickel active material becomes competitive with the gaseous oxygen generating reaction.

Due to the lowering of the charge efficiency (the charge acceptance) that occurs as a consequence of the above phenomenon, there happened a problem of impairing the battery performance at higher temperatures. In the light of such circumstances, various methods have been proposed to improve the charge efficiency (the charge acceptance) by increasing the oxygen overvoltage. For instance, in JP-A-Hei-11-73957 is proposed to increase the oxygen overvoltage by incorporating Ni mixed together with Co and Y in the nickel electrode. In JP-A-Hei-10-125318 is disclosed a method of increasing the oxygen over voltage by providing, as a surface layer portion of the nickel electrode, an independent crystal containing an A-group element selected from Mg, Ca, Sr, etc., and a B-group element selected from Co, Mn, etc., in the form of a solid solution.

Further, in JP-A-Hei-10-149821 is proposed to increase the oxygen over voltage by a method comprising forming a surface layer containing Ca, Ti, etc., at a high concentration on the nickel electrode, while incorporating Al, V, etc., at a high concentration inside the nickel electrode. Furthermore, in JP-A-Hei10-255790 is disclosed a method of increasing oxygen over voltage by covering the surface of nickel hydroxide ($Ni(OH)_2$) particles with a layer of a hydroxide of Ni and Y.

As described above, various methods for increasing the hydrogen overvoltage by using elements such as Ca, Sr, Y, Al, Mn, etc., have been proposed to present. Concerning the positions for adding the elements such as Ca, Sr, Y, Al, Mn, etc. in the aforementioned methods, it is advantageous that these elements are incorporated at the surface of the principal active material, i.e., nickel hydroxide ($Ni(OH)_2$), in such a manner that these elements should be present in abundance in the vicinity of the boundary between the nickel hydroxide and the electrolyte, because the oxygen over voltage can be increased more effectively.

In case of incorporating the elements above at a higher amount in the vicinity of the boundary between the nickel hydroxide and the electrolyte, a sequential operation of first immersing the porous electrically conductive substrate into a solution of an acid salt based on nickel and then immersing the substrate into an alkaline solution after intermediate drying is repeated for a predetermined times to obtain a n active-material loaded plate electrode loaded with a desired amount of active material. Then, the active-material loaded plate electrode thus obtained is immersed in an acid salt solution containing elements such as Ca, Sr, Y, Al, Mn, etc., and after intermediate drying, the resulting active-material loaded plate electrode is immersed in an alkaline solution to form a hydroxide layer of the elements such as Ca, Sr, Y, Al, Mn, etc. on the surface of the active-material loaded plate electrode. Such an operation is preferred from the viewpoint of taking advantage of the existing production lines.

However, if the nitrate solution should be high in temperature and low in pH value in case of immersing the active-material loaded plate electrode in an acid salt solution containing the elements such as Ca, Sr, Y, Al, Mn, etc. as above, there have been found problems of lowering the capacity of the battery due to the elution of the active materials once loaded in the active-material loaded plate electrode. Furthermore, in case the loaded active material should be eluted in a large quantity, corrosion occurred on the porous electrically conductive substrate as to impair the mechanical strength of the porous electrically conductive substrate.

Moreover, the operation of loading the nickel-based hydroxide into the porous electrically conductive substrate for a desired amount, which comprises repeating for predetermined times a sequential operation of first immersing the porous electrically conductive substrate into a solution of an acid salt based on nickel and then immersing the substrate into an alkaline solution after intermediate drying, was found to cause clogging of the pores that are present on the surface of the porous electrically conductive substrate with increasing repetition of the operation. Thus, this prevented uniform impregnation of the nitrate solution containing the elements such as Ca, Sr, Y, Al, Mn, etc. into the inside of the pores that are present in the porous electrically conductive substrate, and thereby led to a problem of an insufficient exhibition of the effect of improving the charge characteristics at high temperature.

SUMMARY OF THE INVENTION

The present invention has been made with an aim to overcome the aforementioned problems. Thus, an object of the present invention is to provide a nickel electrode for alkaline storage batteries improved in the high temperature charge characteristics, and, said nickel electrode being an active-material loaded plate electrode in which, even in case it is immersed in a nitrate solution, the elution of the loaded active material is controlled and thereby prevents the battery capacity from causing a drop.

In order to achieve the above object, there is provided a method of producing a nickel electrode for an alkaline storage battery, comprising: an active-material loading step comprising preparing an active-material loaded plate electrode by loading an active-material containing nickel hydroxide as its principal component into the pores of said porous electrically conductive substrate; an immersion step comprising immersing said active-material loaded plate electrode into an impregnation solution comprising an acid salt solution (such as a nitrate solution) containing at least one element selected from the group consisting of Ca, Sr, Sc, Y, Al, Mn, and lanthanides; and an alkali treatment step comprising forming a hydroxide layer of at least one element selected from the group consisting of Ca, Sr, Sc, Y, Al, Mn, and lanthanides by immersing said plate electrode into an alkaline solution; provided that the temperature of the impregnation solution is controlled in a range of from 40 to 90° C., and that the pH value of impregnation solution is controlled to a range of from 4 to 6.

In performing the method above, if the active-material loaded plate electrode should be immersed in an impregnation solution comprising a nitrate solution containing the elements of Ca, Sr, Sc, Y, Al, Mn, and lanthanides, which is high in temperature and/or low in the pH value, the loaded active material tend to be easily eluted in the nitrate solution. Accordingly, in order to prevent the loaded active material from being eluted from the porous electrically conductive substrate, the temperature of the impregnation solution should be set low, and the pH value of the impregnation solution should be set high. However, if the active material should be completely prevented from being eluted, a uniform permeation of the impregnation solution into inside of the pores would be prevented from occurring by the active material covering the surface of the pores that are present in the porous electrically conductive substrate. This makes it difficult to achieve the effect of forming a layer of a hydroxide of the elements of Ca, Sr, Sc, Y, Al, Mn, and lanthanides; i.e., this makes it difficult to implement a nickel electrode having excellent high temperature charge characteristics.

However, as described in the present invention, if the temperature of the impregnation solution is controlled to a range of from 40 to 90° C., and if the pH value of the impregnating solution is controlled to a range of from 4 to 6, the active material loaded in the pores of the porous electrically conductive substrate can be eluted at a proper degree. As a result, the pores that are present in the porous electrically conductive substrate can be uniformly impregnated with the impregnation solution above deeply into the inside thereof, as to improve the high temperature charge characteristics of the porous electrically conductive substrate. In this manner, a nickel electrode for alkaline storage batteries having a high battery capacity and yet improved in high temperature charge characteristics can be implemented.

DETAILED DESCRIPTION OF THE PREFERRED EMBODIMENTS

1. Preparation of Sintered Substrate

Figure 1:
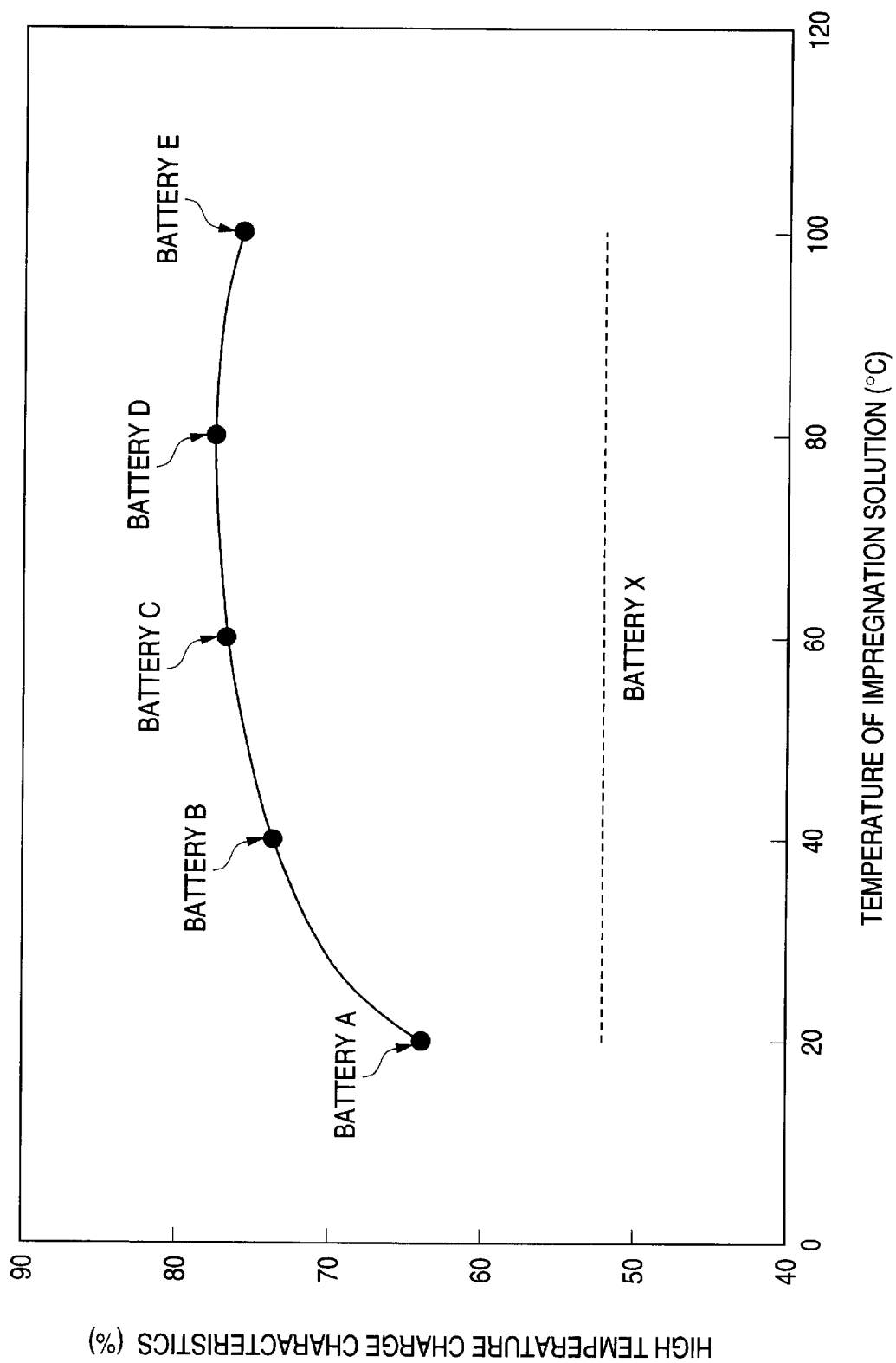
FIG. 1 is a diagram showing the relation between the temperature (° C.) of the impregnation solution and the high temperature charge characteristics (%)

A slurry was prepared by kneading nickel powder together with a sticker such as carboxymethylcellulose and water, and the resulting slurry was applied to an electrically conductive core body made of a punching metal by coating. The electrically conductive core body coated with the slurry was then sintered in a reducing atmosphere to obtain a nickel sintered substrate (porous electrically conductive substrate) having a porosity of about 80%.

2. Preparation of Nickel Electrode (1) Active-material Loaded Plate Electrode

The nickel sintered substrate having a porosity of 80% prepared in the manner described above was immersed in an aqueous solution of an acidic mixed salt comprising nickel nitrate, cobalt nitrate, and cadmium nitrate (for example, an aqueous solution prepared in such a manner that it contains nickel nitrate, cobalt nitrate, and cadmium nitrate at a mass ratio of 92:3:5), having a specific gravity of 1.70 and at a temperature of 70° C., and after drying (drying in this stage is denoted as "intermediate drying"), the resulting substrate was immersed into an aqueous solution of sodium hydroxide at a concentration of 7 mol/liter and at a temperature of 60° C., followed by rinsing. This chemical impregnation operation was repeated 6 times to obtain an active-material loaded plate electrode having its pores loaded with a predetermined amount of active material based on nickel hydroxide. The active-material loaded plate electrode thus obtained was cut into a predetermined size to obtain a nickel plate electrode x.

(2) Acid Salt Treatment of the Active-material Loaded Plate Electrode

Then, the active-material loaded plate electrodes prepared in the manner described above were each immersed into yttrium nitrate $(Y(NO_3)_3 \cdot 6H_2O)$ solution each prepared to a concentration of 1 mol/liter and a pH value of 4, but maintained at various temperatures of 20° C., 40° C., 60° C., 80° C., and 100° C. Then, after drying (the drying in this stage is also denoted as "intermediate drying"), the active-material loaded plate electrodes were each immersed into an aqueous solution of sodium hydroxide the concentration thereof was adjusted to a concentration of 7 mol/liter and at a temperature of 60° C., to thereby convert yttrium nitrate into yttrium hydroxide. In this manner, plate electrodes were prepared, each comprising a nickel sintered substrate having its pores loaded with an active material based on nickel hydroxide and having a yttrium hydroxide coating layer formed on the surface thereof.

The plate electrodes thus obtained were each cut to obtain a nickel plate electrode a, a nickel plate electrode b, a nickel plate electrode c, a nickel plate electrode d, and a nickel plate electrode e. In this case, the nickel plate electrode a was such obtained by immersion in a yttrium nitrate solution at 20° C., the nickel plate electrode b was such obtained by immersion in a yttrium nitrate solution at 40° C., the nickel plate electrode c was such obtained by immersion in a yttrium nitrate solution at 60° C., the nickel plate electrode d was such obtained by immersion in a yttrium nitrate solution at 80° C., and the nickel plate electrode e was such obtained by immersion in a yttrium nitrate solution at 100° C.

3. Production of Nickel-Cadmium Storage Battery

Subsequently, the nickel plate electrodes a to e and the nickel plate electrode x, and a known cadmium electrode plate were each assembled with a polypropylene separator to obtain the assembled electrodes. The assembled electrodes were each inserted into a casing, and an aqueous solution of potassium hydroxide (KOH) having a concentration of 8 mol/liter was injected as an electrolyte to each of the casings to obtain SC size nickel-cadmium storage batteries A to E and X each having a rated capacity of 1,200 mAh.

In this case, the nickel-cadmium storage battery A was prepared from the nickel plate electrode a, the nickel-cadmium storage battery B was prepared from the nickel plate electrode b, the nickel-cadmium storage battery C was prepared from the nickel plate electrode c, the nickel-cadmium storage battery D was prepared from the nickel plate electrode d, the nickel-cadmium storage battery E was prepared from the nickel plate electrode e, and the nickel-cadmium storage battery X was prepared from the nickel plate electrode x.

4. Measurement of High Temperature Charge Characteristics

Each of the batteries A to E and X obtained above was charged with a charge current of 120 mA (0.1 It: It is a value expressed by rated capacity (Ah) 1/h (hour)) for 16 hours at room temperature (25° C.), and was allowed to discharge at a discharge current of 1,200 mA (1 It) at room temperature (25° C.) until the battery potential fell to 1.0 V, to thereby obtain the discharge capacity at room temperature from the discharge time. Then, each of the batteries above was charged with a charge current of 120 mA (0.1 It) for 16 hours at a high temperature (60° C.), and was allowed to discharge at a discharge current of 1,200 mA (1 It) at room temperature (25° C.) until the battery potential fell to 1.0 V, to thereby obtain the discharge capacity at a high temperature (60° C.) from the discharge time. From the measured results thus obtained, the high temperature charge characteristic was obtained in accordance with equation (1) below. Results as shown in Table 1 were obtained.

High temperature charge characteristic (%)=[(Discharge capacity at high temperature)/(Discharge capacity at room temperature)]×100% (1)

TABLE 1

| Battery type | Impregnation with Y(NO$_3$)$_3$.6H$_2$O | Temperature of impregnation solution (° C.) | High temperature charge characteristic (%) |
|---|---|---|---|
| A | yes | 20 | 64 |
| B | yes | 40 | 74 |
| C | yes | 60 | 77 |
| D | yes | 80 | 78 |
| E | yes | 100 | 76 |
| X | no | — | 52 |

Then, based on the results above, the high temperature charge characteristic values (%) were plotted by taking them on the ordinate and by taking the temperature of the impregnation solution (° C.) on the abscissa to obtain a result as shown in FIG. 1. Table 1 and FIG. 1 clearly read that the high temperature charge characteristics for the batteries A to E using the electrode plates a to e each prepared by impregnating each of the active-material loaded plate electrodes with yttrium nitrate (Y(NO$_3$)$_3$.6H$_2$O) solution are improved as compared with that of the battery X using a plate electrode x not impregnated with the yttrium nitrate (Y(NO$_3$)$_3$.6H$_2$O) solution.

Presumably, the result above can be explained as follows. In case the active-material loaded plate electrode is immersed in a yttrium nitrate solution, the loaded active material that is eluted into the yttrium nitrate solution increases with elevating temperature, and hence, the nitrate solution can be more uniformly impregnated into the inside of the pores that are present in the porous electrically conductive substrate to improve the high temperature charge characteristic. Since a battery having a high temperature charge characteristic value, which is calculated in accordance with the definition of equation (1), of 70% or higher can be safely said as a battery having a high capacity at high temperatures, it can be understood that a battery having excellent high temperature charge characteristics can be obtained by setting the temperature of yttrium nitrate to 40° C. or higher.

5. Study on the pH Value of the Acid Salt Solution

Then, the plate electrode x obtained above was immersed in an impregnation solution comprising yttrium nitrate solution whose concentration was adjusted to 1 mol/liter. Then, while setting the temperature of each of the impregnating solutions constant at 20° C., 40° C., 60° C., 80° C., 90° C., and 100° C., the pH value at each temperature was varied to 2.5, 3.0, 3.5, 4.0, 4.5, 5.0, 5.5, and 6.0 to obtain the rate of mass change (%) of the plate electrode in accordance with equation (2), by taking the rate of change in the mass of the plate electrode x after immersing it into the impregnation solution (mass after immersion) with respect to the mass of the plate electrode x before immersing it into the impregnation solution (mass before immersion).

Rate of mass change (%)=((mass before immersion−mass after immersion)/mass before immersion)×100% (2)

Figure 2:
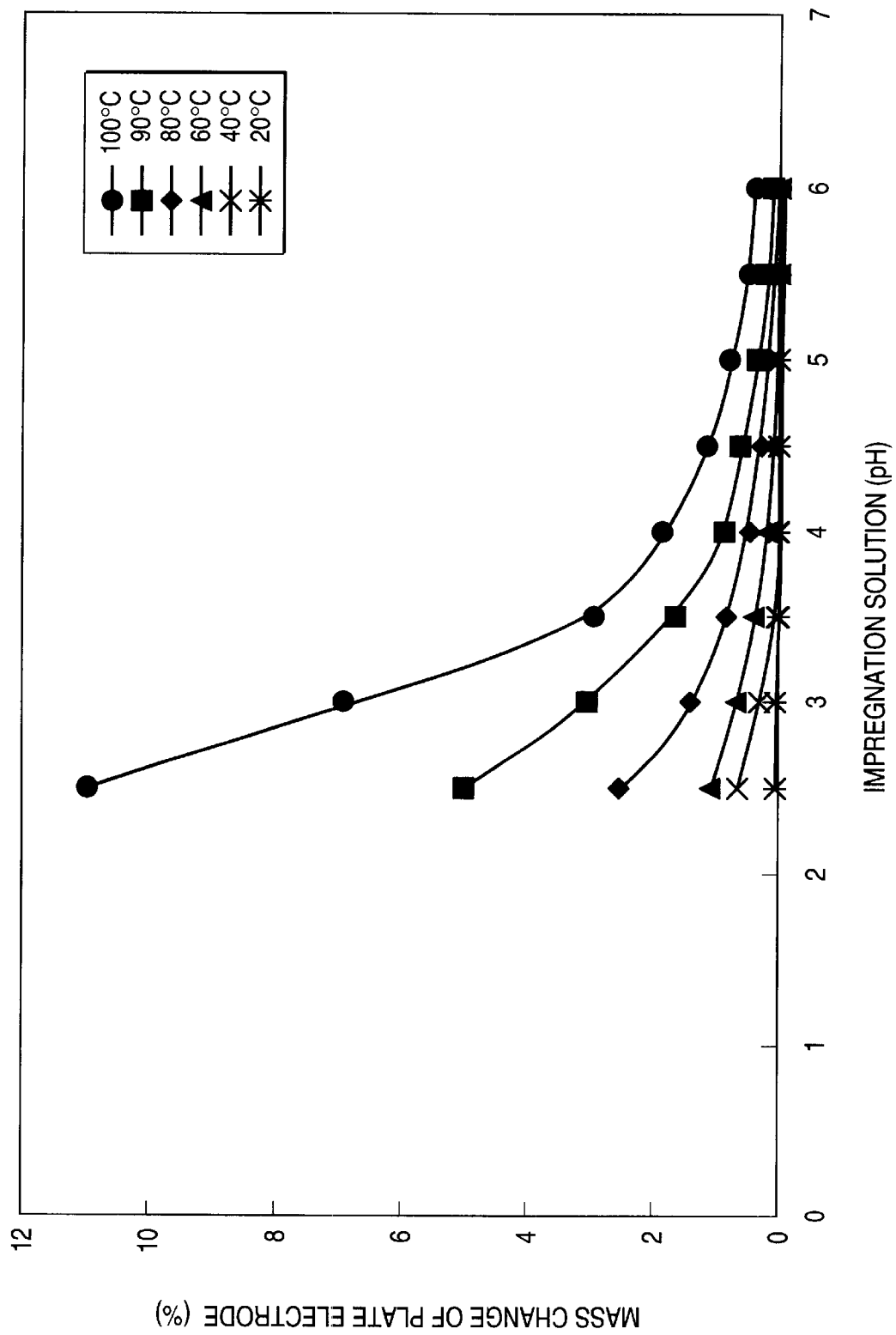
FIG. 2 is a diagram showing the relation between the pH of the impregnation solution at each temperature and the rate of mass loss (%).

Based on the results thus obtained, the measured results were plotted by taking the rate of mass change (%) on the ordinate with respect to the pH values of the impregnation solution taken on the abscissa to obtain the results shown in FIG. 2.

From the results in FIG. 2, it can be clearly understood that the rate of mass change increases with elevating temperature of the impregnation solution. That is, the elution quantity of the active material loaded on the porous electrically conductive substrate increases with increasing temperature of the impregnation solution. An SC size Nickel-Cadmium storage battery using the above-described electrodes was produced in the same way as discussed in [3. Production of Nickel-Cadmium storage battery]. Further, the discharge capacitance at normal temperature was obtained in the same way as discussed in [4. Measurement of High Temperature Charge Characteristics].

In general, the capacity of the battery decreases with increasing amount of the elution of the active material loaded on the porous electrically conductive substrate. Accordingly, the quantity of the eluted active material should be controlled as such that the impregnation solution is uniformly impregnated in the pores that are present in the porous electrically conductive substrate. Thus, as is clearly read from the results shown in FIG. 2, the temperature of the impregnation solution should be controlled to fall in a range of 90° C. or lower, because the elution quantity is excessive in case the temperature is set to 100° C. On the other hand, even if the temperature of the impregnation solution should be controlled to 90° C. or lower, the elution quantity increases with decreasing pH value of the impregnation solution. Thus, the pH value of the impregnation solution must be controlled to fall in a range of 4 or higher. Further, since yttrium hydroxide begins to precipitate in the impregnation solution as the pH value of the impregnation solution exceeds 6, the pH of the impregnation solution must be set to a value of 6 or lower.

Conclusively, it can be understood from the results above that, to obtain a battery having a high charge efficiency at high temperatures without causing drop in battery capacity, it is preferred that the temperature of the impregnation solution comprising acid salt solution is controlled to fall in a range of 40° C. or higher but not higher than 90° C., and that the pH value of the impregnation solution is controlled to a range of 4 or higher but not higher than 6.

Further, the mode of practicing the present invention above have been described for embodiments using yttrium nitrate for the acid salt solution, however, similar effects can be obtained in cases using acid salt solutions containing Ca, Sr, Sc, Al, Mn, and lanthanide elements instead of using yttrium nitrate solution for the impregnation solution.

What is claimed is:

1. A method of producing a nickel electrode for an alkaline storage battery comprising loading a positive-electrode active material containing nickel hydroxide as its principal component into the pores of a porous electrically conductive substrate, the method comprising:

an active-material loading step comprising preparing an active-material loaded plate electrode by loading an active-material containing nickel hydroxide as its principal component into the pores of said porous electrically conductive substrate;

an immersion step comprising immersing said active-material loaded plate electrode into an impregnation solution comprising an acid salt solution containing at least one element selected from the group consisting of Ca, Sr, Sc, Y, Al, Mn, and lanthanides; and an alkali treatment step comprising forming a hydroxide layer of at least one element selected from the group consisting of Ca, Sr, Sc, Y, Al, Mn, and lanthanides by immersing said plate electrode into an alkaline solution;

provided that the temperature of the impregnation solution is controlled in a range of from 40 to 90° C. and that the pH value of impregnating solution is controlled to a range of from 4 to 6.

2. A method of producing a nickel electrode for an alkaline storage battery as claimed in claim 1, wherein said acid salt solution is a nitrate solution.

3. A method of producing a nickel electrode for an alkaline storage battery comprising loading a positive-electrode active material containing nickel hydroxide as its principal component into the pores of a porous electrically conductive substrate, the method comprising:

an active-material loading step comprising preparing an active-material loaded plate electrode by loading an active-material containing nickel hydroxide as its principal component into the pores of said porous electrically conductive substrate;

an immersion step comprising immersing said active-material loaded plate electrode into an impregnation solution comprising an acid salt solution containing at least one element selected from the group consisting of Ca, Sr, Sc, Y, Al, Mn, and lanthanides; and an alkali treatment step comprising forming a hydroxide layer of at least one element selected from the group consisting of Ca, Sr, Sc, Y, Al, Mn, and lanthanides by immersing said plate electrode into an alkali;

wherein, in said immersion step, a part of the positive-electrode active material loaded in the active-material loaded plate electrode is eluted to allow said impregnation solution to uniformly permeate into the inside of the pores that are present in the active-material loaded plate electrode.

4. A method of producing a nickel electrode for an alkaline storage battery as claimed in claim 3, wherein said acid salt solution is a nitrate solution.

* * * * *